Nov. 12, 1963

G. W. MEADOWS ET AL 3,110,681

PROCESS FOR THE PREPARATION OF CUBIC
COLLOIDAL ZIRCONIA AQUASOLS
Filed Jan. 2, 1959

INVENTORS
GEOFFREY W. MEADOWS
GEORGE W. SEARS, JR.

BY John W. Klooster

ATTORNEY

United States Patent Office 3,110,681
Patented Nov. 12, 1963

3,110,681
PROCESS FOR THE PREPARATION OF CUBIC COLLOIDAL ZIRCONIA AQUASOLS
Geoffrey W. Meadows, Kennett Square, Pa., and George W. Sears, Jr., Wilmington, Del., assignors to E. I. du Pont de Nemours and Company, Wilmington, Del., a corporation of Delaware
Filed Jan. 2, 1959, Ser. No. 784,641
3 Claims. (Cl. 252—313)

This invention relates to stable concentrated aquasols of cubic zirconia, to the corresponding dry-water dispersible powders, and to processes for their preparation.

Cubic colloidal zirconia, heretofore unknown in the colloidal form, is particularly useful in the preparation of refractory bodies and in the production of ceramic-like coatings on metal surfaces. Ceramics of cubic zirconia give satisfactory service as refractories up to about 2500° C. The sols are also suitable for application as antisoiling agents on rugs, fabrics, paper or on any other surface prone to soiling. Aquasols and aqueous dispersions of cubic zirconia can be incorporated into water-base paint compositions.

As the art appreciates, the pure cubic modification of zirconia that is stable above 1900° C. is rarely encountered (see Blumenthal—"The Chemical Behavior of Zirconium," D. Van Nostrand Company, Inc., 1958) and must be stabilized by small percentages of lime, magnesia, or certain other oxides dissolved in the lattice. No one has heretofore prepared in colloidal form a pure cubic zirconia. These has now been produced in accordance with the teachings of this invention colloidal cubic zirconia.

More particularly, this invention relates to cubic zirconia aquasols in which the concentration of zirconia is in the range of about 10 to 85%, the pH is from about 2 to 5, and the percent solids in the dispersed phase is at least 40 and preferably 50 or greater. The invention also relates to dry powders of cubic colloidal zirconia in the form of dense substantially unaggregated particles in the size range between 5 and 200 millimicrons which are readily dispersible in water to form stable aquasols. The products are prepared by processes in which zirconium tetrachloride is hydrolyzed in the vapor phase to produce aerosols of cubic zirconia. These aerosols can be converted directly into aquasols, or they can be collected as dry powders. Such dry powders can be dispersed in water to give true aquasols of the cubic colloidal zirconia.

To aid in further understanding the invention, reference can be had to the following drawings.

Figure 1:
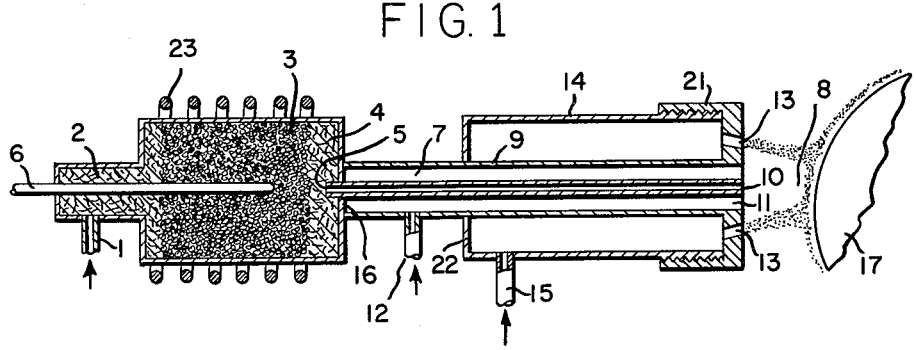
FIGURE 1 shows a cross-sectional view of apparatus used for hydrolyzing zirconium tetrachloride to zirconia at temperatures between about 1000° and 2000° C.

Details of the processes and products will now be described and then working examples will be presented.

PROCESSES

Cubic colloidal zirconia is made by the processes of this invention by mixing zirconium tetrachloride vapor with water vapor at elevated temperatures in a suitable furnace. Hydrolysis of the zirconium tetrachloride occurs and zirconium dioxide or zirconia is produced in the form of an aerosol.

A principal by-product of this vapor-phase hydrolysis is hydrogen chloride, which is produced in accordance with the following equation:

(1) $ZrCl_4 + 2H_2O \rightarrow ZrO_2 + 4HCl$

This Equation 1 is representative of the over-all reaction involved. As can be seen from Equation 1, the water vapor should in general be present in an amount just sufficient to react with all zirconium tetrachloride vapor present. In general, zirconium tetrachloride is hydrolyzed to cubic colloidal zirconia at temperatures from about 1200 to 1800° C.

When hydrolyzing zirconium tetrachloride in a combustion zone, a large excess of water vapor will normally be present. The actual amount of the vapor depends upon the ratio of fuel to $ZrCl_4$ in the flame and the degree of combustion. In general, the $H_2O:ZrCl_4$ can vary over the range 3:1 to 500:1.

By controlling the contact time of the mixture of zirconium tetrachloride vapor and water vapor in the zone of elevated temperature and also by controlling the temperatures of this zone, the physical characteristics of the cubic colloidal zirconia produced can be varied over wide ranges. The methods of controlling contact times and flame temperatures will be discussed below.

Above about 1200° C., cubic $ZrO_2$ is formed in a flame. The temperature of the flame is controlled by adjusting the ratio and concentration of fuel to oxygen entering the combustion zone. The contact time is varied by changing the length of the flame and the velocities of the various gases.

The average particle size of the flame hydrolysis products increases with contact time and temperature. The degree of aggregation of the particles does increase markedly with increasing contact time.

Hydrolysis in a high temperature flame permits the use of very short contact times and gives products having minimum aggregation. By keeping the contact times as short as possible, the formation of large particles is easily avoided. For example, at contact times from about 1 to 50 milliseconds and flame temperatures of 1200° C. to 1800° C., the zirconia average particle diameter ranges from 20 to 200 millimicrons.

Quenching time after hydrolysis also influences product characteristics. It is essential to quench rapidly. Generally speaking, the more rapidly the particles are quenched, the less aggregated they are. It is apparent that rapid quenching to a temperature less than 100° C. is of great significance in terms of the final product characteristics, less than 1 second being necessary and less than 0.1 second being preferred when making the cubic colloidal zirconia of the invention.

Zirconium tetrachloride vapor is obtained from anhydrous solid $ZrCl_4$ by heating to about the sublimation temperature of 330° C. and passing an inert gas such as dry nitrogen or air through a bed of solid to pick up the vapor formed. At 273° C., the partial pressure in an equilibrium mixture is 0.1 atm. At 332° C., the partial pressure in an equilibrium mixture is 1 atm. The amount actually entrained depends on the size of the bed, rate of inert gas flow and amount of surface presented.

The zirconium tetrachloride vapor is introduced into a high temperature zone produced by burning a hydrogen-containing fuel. When this technique is used for producing cubic colloidal zirconia, the zirconium tetrachloride vapor can be either premixed with the combustible gas mixture or introduced separately into the combustion zone.

Combustible gas hydrogen-containing fuels can be used in great variety. Hydrogen, methane, ethane, propane, butane, etc., or mixtures of these paraffinic hydrocarbons with hydrogen can be used. Natural gas, water gas, coal gas and the like can be used. At least 6 hydrogen atoms per $ZrCl_4$ molecule in the overall feed are desired. In practice, there is probably more than this number of hydrogen atoms per $ZrCl_4$ molecule.

These gases can be ignited using any pilot light to initiate and maintain combustion. The flame temperature depends upon the amount of diluent gas (such as dry helium or dry nitrogen), amount of oxygen above the stoichiometric combustion requirement, and on the type and amount of combustible gas used. Thus, maximum temperatures are produced by burning hydrogen plus oxygen (2660° C.), hydrogen plus air (2050° C.), natural gas plus oxygen (2930° C.) and natural gas plus air (1950° C.).

Contact time is controlled by the length of the flame or by the distance from the nozzle to the quencher or by the volume of the stream containing metal halide within the flame. The rate of gas flow-out of the metal halide vaporizer also influences contact time.

$ZrO_2$ yields are affected by the design of the particular furnace used. One suitable form of flame furnace for use with temperatures above 1200° C. will now be described with reference to FIGURE 1.

The furnace shown operates as follows: A stream of thoroughly dried gas, such as air or nitrogen, is introduced at inlet port 1. This gas can be dried by passing it through any conventional dehydration apparatus using a desiccant, such as anhydrous calcium sulfate for example.

This dried gas is passed through a filtering plug 2 constructed of glass wool or other similar material and on into a bed 3 of zirconium tetrachloride in the form of granules. As the gas passes through this bed of zirconium tetrachloride, quantities of zirconium tetrachloride are vaporized and passed along with the gas through filtering plug 4 and on out through gas orifice 5. The gas leaving this bed is saturated with zirconium tetrachloride vapor.

This zirconium tetrachloride bed is surrounded by electric heating coils 23 which maintain the temperature of the bed between about 200° and 400° C. Usually the bed will be operated in the temperature range of from about 250° to 350° C. The temperature of the zirconium tetrachloride bed is measured by means of a thermocouple 6.

To the gas outlet port 5 of zirconium tetrachloride bed 3 is connected a conducting pipe 7 which leads the dry gas bearing zirconium tetrachloride vapor to orifice 10 in burning zone 8 as indicated.

This pipe 7 is surrounded by a larger concentric conducting pipe 9 extending from the zirconium tetrachloride bed to the burning zone 8. Although sealed at the region 16 of the zirconium tetrachloride bed 3, the other end of pipe 9 extends to an orifice 11 in the burning zone 8. This conducting pipe 9 is used to convey an annular stream of thoroughly dry gas such as air or nitrogen to the burning zone 8 so as to delay the entry of zirconium tetrachloride vapor from pipe 7 into the burning zone 8 until the vapor is clear of orifice 10. The dry, non-combustible gas is introduced into the pipe 9 through an entry orifice or orifices 12. This gas stream effectively retards deposition of zirconia upon the burner tip 10 in burning zone 8.

A larger diameter pipe 14 surrounds pipes 7 and 9. This pipe 14 extends from the burning zone 8 back to the region 22 just before the orifice 12 through which the dry gas is fed into pipe 9. Pipe 14 is sealed in the region 22, but in the burning zone 8 the end of pipe 14 is fitted with a nozzle 21 containing orifices 13. The combustible gas mixture is introduced into pipe 14 through entry port 15. The combustible gas mixture then is passed through port 14 and out through orifices 13, where it is ignited to burn in a ring of flames directed toward a common focus, so that they combine to form a converging conical-shaped combustion zone.

Pipes 14 and 9 can have the exterior surface heated with an electric heating coil in order to both preheat the gases and to prevent deposition of zirconium tetrachloride vapor within tube 7. This coil is not shown in the drawing.

The flame at the tip of the burner should be contained preferably in as small a cross section as possible and still surround both the central zirconium tetrachloride vapor stream issuing from orifice 10 and also maintain maximum temperatures at the confluence of fuel gases and zirconium tetrachloride vapor. Contact time is a function of the geometry of the flame. As shown, orifice 13 should be angled to help maintain a small cross sectional area of flame.

In general, no particular significance attaches itself to the size and length of pipes. Other than the fact that zirconium tetrachloride vapor must not be allowed to condense within pipe 7, no criticality exists as regards the min. temperatures of the gases in pipes 7, 9 and 14.

Because water vapor is produced in large quantities in the burning zone in amounts greatly in excess of the stoichiometric quantity needed to form zirconia, no particular difficulty is encountered in achieving complete hydrolysis of the chloride. In general, there must be at least 2 mols of hydrogen for each mol of zirconium tetrachloride present.

Figure 2:
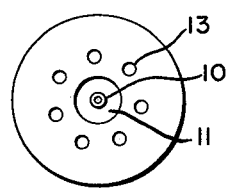
FIGURE 2 shows an end view of the burning zone of the furnace shown in FIGURE 1.

The arrangement of the various orifices in the burning zone 8 is more clearly described by the end view of the burner shown in FIGURE 2. The dry gas plus zirconium tetrachloride vapor issues from exit orifice 10. The annular stream of dry carrier gas issues at orifice 11. The combustion gas mixture issues through exit ports 13.

The zirconia particles can be separated from the combustion gases by a wet process.

Figure 3:
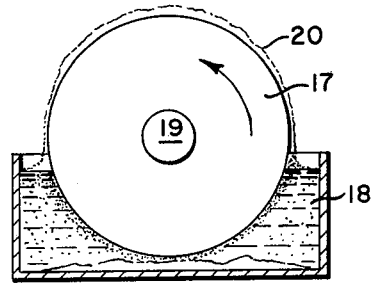
FIGURE 3 shows one form of wet quenching apparatus for use in preparing aquasols or dispersions of colloidal cubic zirconia.

A wet process for removing cubic colloidal zirconia particles from the combustion gases by a collector means will now be described by reference to FIGURE 3. The hot stream of reaction products from a furnace is impinged upon a continuously cooled surface. The particular surface shown in FIGURE 3 is a continuously rotated drum. The reaction products are directed on to the surface of this drum which is wetted with water from a bath 18. As the drum rotates upon an axis 19, cubic colloidal zirconia particles are removed from the gases as an aqueous dispersion, aqueous slurry or true aquasol containing the cubic colloidal zirconia produced by the hydrolysis of zirconium tetrachloride. The surface 20 of the drum 17 contains a thin coating of water against which the impinging stream of reaction products strikes.

The surface of the drum should be inert to hydrogen chloride and can be constructed from glass, tantalum or the like. The drum should be rapidly rotated, but no splashing should occur. If rotation is too slow, drying of the water vapor at the spot heated by the impinging stream of gaseous reaction products will occur and little or no zirconia will be collected. The drum is preferably cooled internally by means of a circulating coolant (means not shown in FIGURE 3) so that the water bath 18 used to collect the product does not boil. The water collection bath 18 is preferably maintained between freezing and boiling temperatures.

As hydrogen chloride builds up in water bath 18 the sol coagulates and settles out. Sol particles can be peptized by increasing the pH above about 2 and below about 4.5 by removal of excess acid. At low pH's (below 2) acidity of the water is too great to permit stable sols. The potential on the particles drops, and they collide and stick or coagulate.

If a true sol is desired, the pH must be controlled; but if mere sediment containing zirconia is desired, the pH need not be controlled. Sediment can be filtered and repeptized later in water to give true sols directly.

Both the pH and the volume content of the water can be regulated by circulating water in the bath through an ion exchange resin until the desired concentration of zirconia in water is obtained. Anionic resins only are used. Examples include Dowex 2; Amberlite IRA 400, 401, 410 and 411; Amberlite IR 4B, and the like. The product can be freed from excess acids and salts by washing following filtration or centrifugation. The product can be dried to produce a dense powder.

The cubic colloidal zirconia aerosols as made can be quenched by admixture of the combustion products with an inert cold gas. The dry powder can then be collected using conventional methods such as smoke filters or electrostatic precipitators and later dispersed in water adjusted to the correct pH to give a stable sol.

PRODUCTS

In general, the foregoing processes produce zirconia in which the $ZrO_2$ is at least 50% in the cubic form. Preferably, these processes produce zirconia containing from 90 to 100% by weight of $ZrO_2$ in the cubic form.

The particles are dense and spheroidal and all dimensions are in the colloidal size range. More particularly, they are in the size range of from about 5 to 200 millimicrons in diameter, and, more preferably, are from about 20 to 100 millimicrons in diameter. They have a density in the range of from about 5.5 to 6.27 grams per cubic centimeter and, more preferably from about 5.9 to 6.27 grams per cubic centimeter.

It is well known that zirconia exists in three different crystalline modifications. The stable form exists up to 1000° C. in the monoclinic modification. From 1000° C. to 1900° C., the stable form is tetragonal, while above 1900° C., only the cubic form is stable.

The unexpected feature here is the formation of the cubic form in the temperature range where the tetragonal form is stable.

It is thus one of the very remarkable features of this invention that stable cubic colloidal zirconia is produced in substantially pure form at temperatures below 1900° C. This is a result contrary to what one would expect from the teachings in the art and has immediate practical consequences.

For instance, zirconia having the cubic crystalline modification makes an excellent high temperature ceramic. But to make a dimensionally stable zirconia ceramic by binding a particulate zirconia material with a colloidal zirconia binder, one must use zirconia having the cubic crystalline modification. For if one uses zirconia having the monoclinic crystalline modification in a ceramic, such ceramic would disintegrate at about 1000° C. when the crystalline structure undergoes a phase change from a monoclinic to a tetragonal crystalline configuration.

The ultimate particle size of the individual zirconia particles produced is best determined by nitrogen surface area determination, although it may also be estimated from electron micrographs. A method for measuring nitrogen adsorption is described in "A New Method for Measuring the Surface Areas of Finely Divided Materials and for Determining the Size of Particles" by P. H. Emmett in "Symposium on New Methods for Particle Size Determination in the Sub-Sieve Range" in the Washington Spring Meeting of the A.S.T.M., March 4, 1941. The sol to be measured is deionized, transferred to propanol by distillation and dried in a vacuum oven. The surface area of the particles as measured by nitrogen adsorption, is in a range of 5 to 200 square meters per gram, and preferably is in the range of 10 to 100 $M^2/g$.

The surface area of dense spheres of cubic zirconia in $M^2/g$., A, is related to the average diameter, D, expressed in millimicrons, mm. and is measured by electron micrograph, by the expression $$A = \frac{1000}{D}$$

Thus, the diameter of the particles is in the range 5–200 mm. and preferably 10–100 mm. (millimicrons).

By electron diffraction, the zirconia particles of this invention show a pattern which is substantially that of the cubic crystal lattice of zirconia, as shown by A.S.T.M. electron diffraction data card No. 7–337 for cubic zirconia. It is quite unexpected that the processes described above for the preparation of the zirconia sols of the invention should give the cubic form of zirconia. Normally, this modification is obtained only above 1900° C. and yet hydrolysis of $ZrCl_4$ in the vapor phase produces the cubic modification at temperatures as low as 1200° C.

As for the aquasols, they represent a form of zirconia aquasol which contains a higher concentration of zirconium dioxide than any other zirconia aquasol heretofore know. As has been pointed out, these aquasols contain a concentration of zirconia in the range of 10 to 85% by weight and have a pH within a range of about 2 to 5. The percent solids in the dispersed phase is at least 40 and preferably at least 50.

The concentration of zirconia in the aquasols of the invention can vary very widely. Sols prepared according to the processes of this invention may contain up to 80% zirconium dioxide and still be quite fluid. In general, it is preferred that the sols contain at least 10% zirconium dioxide.

As has been noted above, the percent solids in a dispersed phase, S, is at least 40 for products of the invention. The value of S, as calculated by the formula more particularly described below is in the range of 50 to 90 for preferred products of the invention. This figure for the percent solids in a dispersed phase reflects the fact that the particles are very dense and discrete. Density and discreteness are properties which are essential for the preparation of concentrated stable zirconia aquasols.

The percent solids in the dispersed phase, indicated by S, can be determined from the relationship:

$$S = \frac{Z}{c(1 - 0.0084Z) - 0.0084Z}$$

where S is the percent $ZrO_2$ in the dispersed phase and Z is the percent $ZrO_2$ in the sol as measured by quantitative analysis and c is the fraction of the total volume which is occupied by the viscosity creating phase. c can be determined by the Mooney equation disclosed in "The Journal of Colloid Science," vol. 6, pages 162 to 170, 1951, which equation shows the relationship between viscosity and the percent solids in the dispersed phase for spherical colloidal particles.

The zirconia:anion mol ratio of the preferred sols of the invention is in the range of from about 1:1 to 70:1. This corresponds to a preferred pH range of from about 2 to about 5.

In preparing the sols of this invention, it is preferred to use cubic colloidal $ZrO_2$ prepared at high temperatures because such particles tend to be more discrete than those produced at lower temperatures. The sols prepared from such particles thus tend to contain a greater concentration of $ZrO_2$ than any $ZrO_2$ sols heretofore known because of the discrete nature of the cubic $ZrO_2$. More particles can be packed into a unit volume of colloidal suspension when highly discrete particles are used. In addition, there is a gain in $ZrO_2$ concentration because of the increase in density of the cubic form over the monoclinic form. The concentrated sols of zirconia can be used as fluids in automatic transmission as a heavy power transmission fluid. Such sols make it possible to cut down transmission size and provide better power transmission from engine to load.

In order that the invention may be better understood, reference should be made to the following illustrative examples.

*Example 1*

The apparatus used is illustrated in FIGURES 1, 2 and 3. A stream of nitrogen (100 ml./min.) is passed through a tube containing zirconium tetrachloride at 400° C., and injected into the center of a ring of oxygen gas flames, being protected momentarily from the water vapor formed in the flame by an annular stream of dry nitrogen (200 ml./min.). Methane and oxygen are metered to the burner at flow rates of 3350 and 3300 ml./min., respectively, giving a flame temperature of about 1800° C.

The zirconium tetrachloride throughput is about 20 g. per hour. The contact time in the combustion zone is 0.0025 second. The flame is made to impinge on a glass cylinder rotating about a horizontal axis at about 150 r.p.m. with the lower one-third of the cylinder immersed in water contained in a glass bath so that it continuously picks up a film of water. A stream of cooling water flows continuously through the cylinder. Thus, quenching time is of the order of 0.1 second.

A high quality zirconia sol is formed initially, but the bulk of the zirconia is coagulated after a short time, due to the high acidity which develops as the hydrogen chloride by-product dissolves in the quenching water. After three hours the resulting partially coagulated suspension is centrifuged and 44 grams of centrifuged cake is obtained which is diluted to 200 grams by the addition of water. The pH of the liquid phase is 0.8 and the suspension is deionized to pH 2.60 using Dowex 2 (Nalcite SAR) a polymeric quaternary amine anion exchange resin. The fluid sol which is obtained is filtered through coarse filter paper and is found to contain 9.3% zirconia. The zirconia particles in the sol are about 50 millimicrons in diameter. The specific surface of the dry solids was about 20 $M^2/g$. The percent solids, S, in the dispersed phase is 77, as measured by the above described procedure.

Electron diffraction measurements on a sample of the powder obtained by evaporating a portion of the sol to dryness shows the zirconia to be substantially in the cubic form. The particles are spheroidal.

A concentrated sol is prepared by the following procedure: 222 grams of the 9.3% sol, described above, is centrifuged at high speed to remove most of the water. A cake weighing 26.5 grams is obtained containing a small amount (1–2 ml.) of supernatant. This is stirred up to give a paste, four drops of normal hydrochloric acid are added and the sol becomes quite fluid. After shaking for one hour a uniform stable sol is obtained having a solids content of 75.9%, a pH of 2.8 and a density of 2.737 g./cc. at about 20° C.

*Example 2*

Using the furnace and flow rates described in Example 1 with a zirconium tetrachloride input rate of 15 grams per hour, a flame length of 3 cm. (distance from burner orifice to surface of quenching cylinder) and a contact time in the combustion zone of 0.0025 second are used, the flame impinges on a stainless steel quenching cylinder instead of the glass cylinder described in Example 1. Even more rapid quenching times are obtained by the use of steel.

A sol is formed initially, but the zirconia coagulates after a short time and the liquid is colored green, evidently due to attack on the steel cylinder by the acidic effluent gas. After just over three hours the partially coagulated suspension is converted to a fluid sol as described in Example 1.

The resulting sol contains 13.3% zirconia, has a percent solids, S, in the dispersed phase of 83, a pH of 2.7 and a molar ratio Zr:Cl of 62. A sample of the dried zirconia powder from the sol has a nitrogen surface area of 22 $M^2/g$. and an average particle diameter of 53 millimicrons, by electron micrograph. Electron diffraction shows a mixture of the cubic and monoclinic phases, with the cubic giving much the stronger pattern. The particles are spheroidal.

*Example 3*

The furnace and flow rates are as described in Example 1, except that the methane and oxygen are metered to the burner at flow rates of 3350 and 2500 ml./min., respectively, giving a flame temperature of about 1300° C. The zirconium tetrachloride input is 20 grams per hour and the contact time in the combustion zone is 0.0025 second. The partially coagulated suspension obtained after four hours is converted to a fluid sol as described in Example 1.

The resulting sol contains 21.2% zirconia, has a percent solids, S, in the dispersed phase of 51, a pH of 2.1 and a molar ratio Zr:Cl of 12. A sample of the dried zirconia powder from the sol has a nitrogen surface area of 140 $M^2/g$. and an average particle diameter of 10 millimicrons, by electron micrograph. Electron diffraction shows the zirconia to be mainly in the cubic modification. The particles are spheroidal.

*Example 4*

The furnace and flow rates are described in Example 1. The methane and oxygen are metered to the burner at flow rates of 3350 and 2500 ml./min., respectively, giving a flame temperature of about 1300° C. The zirconium tetrachloride input is 4 grams per hour and the contact time in the combustion zone is 0.02 second. The partially coagulated suspension obtained after seven hours is converted into a fluid sol as described in Example 1.

The resulting sol contains 15.0% zirconia, has a percent solids, S, in the dispersed phase of 65 and a pH of 2.3. A sample of the dried zironia powder from the sol has a nitrogen surface area of 9 $M^2/g$. and an average particle diameter of 120 millimicrons, by electron micrograph. Electron diffraction shows the zirconia to be mainly in the cubic modification. The particles are spheroidal.

*Example 5*

The apparatus used is illustrated in FIGURES 1, 2 and 3. No annular stream of nitrogen is used. The zirconium tetrachloride is entrained in a dry nitrogen stream (150 ml./min.) which passes through a saturator at 300° C. and mixes with the preheated methane (2200 ml./min.) and oxygen (2200 ml./min.) stream at the burner nozzle. The gas and oxygen are thoroughly dried by passing through towers containing "Drierite" (anhydrous calcium sulfate) to avoid hydrolysis of zirconium chloride in the mixing zone and the consequent plugging of the nozzle. Build-up of zirconia on the burner tip is largely prevented by operating at gas flow rates too high for the flame to burn at the tip of the burner, but such that it burns at a small pilot flame placed a short distance from the burner tip.

The combustion products are quenched in water using a water-cooled rotating cylinder, as described in Example 1. The partially coagulated suspension obtained after two hours is converted to a fluid sol, as described in Example 1.

The resulting sol contains 6.1% zirconia, has a percent solids, S, in the dispersed phase of 68 and a pH of 2.7. A sample of the dried zirconia powder from the sol has a nitrogen surface area of 50 $M^2/g$. end an average particle diameter of 25 millimicrons, by electron micrograph. Electron diffraction shows both the cubic and monoclinic zirconia phases, with the former greatly predominating. The particles are spheroidal.

*Example 6*

To 30 grams of zirconia powder, in the size range of 2–50 microns, the zirconia being stabilized in the cubic modification by the presence of about 2% calcium oxide, is added 15 grams of the concentrated sol prepared as described in Example 1, and 10 grams of water and the whole mixed to a uniform consistency. The wet mix is aged at room temperature for five days and the air dried mass is then heated to 110° C. for an additional day. It is finally fired at 1800° C. and cooled slowly to produce a hard zirconia refractory.

This application is a continuation-in-part of our copending application Serial No. 709,344, filed January 16, 1958 and now abandoned.

The claims are:

1. In a process for the preparation of cubic colloidal zirconia aquasols by the vapor phase hydrolysis of zirconium tetrachloride followed by dispersion of the hydrolyzed product in the water, the steps of passing a mixture of zirconium tetrachloride vapor and water vapor into the center of a ring of oxygen-gas flame wherein the temperature is at least 1200° C. and then immediately quenching the resulting zirconia aerosol to a temperature below about 100° C. in a time of less than about one second by rapidly mixing such aerosol with an inert cold gas.

2. In a process for the preparation of cubic colloidal zirconia aquasols by the vapor phase hydrolysis of zirconium tetrachloride followed by dispersion of the hydrolyzed product in the water, the steps of passing a mixture of zirconium tetrachloride vapor and water vapor through a temperature zone maintaining the range of about 1200 to 1800° C. in a time of from about 1 to 50 microseconds and then immediately directing the hot reaction products upon a continuously cooled surface so that the products will be cooled to a temperature below about 100° C. in a time of less than about 1 second.

3. In a process for the preparation of cubic colloidal zirconia aquasols by the vapor phase hydrolysis of zirconium tetrachloride followed by dispersion of the hydrolyzed product in water, the steps of (1) passing a mixture of zirconium tetrachloride vapor and water vapor into and through the center of a ring of oxygen-gas flame wherein the temperature is maintained in the range of 1200 to 1800° C. in a time of about 1 to 50 microseconds, (2) then immediately quenching the resulting zirconia aerosol to a temperature below about 100° C. in a time of less than about 1 second by rapidly mixing such aerosol with an inert cold gas, and (3) peptizing the so-obtained product in water maintained at a pH in the range from about 2 to 4.5.

References Cited in the file of this patent

UNITED STATES PATENTS

| | | |
|---|---|---|
| 2,270,527 | Kinzie et al. | Jan. 20, 1942 |
| 2,384,428 | Axt | Sept. 11, 1945 |
| 2,635,946 | Weber et al. | Apr. 21, 1953 |
| 2,750,345 | Alexander | June 12, 1956 |
| 2,763,620 | Bugosh | Sept. 18, 1956 |
| 2,984,628 | Alexander et al. | May 16, 1961 |

FOREIGN PATENTS

| | | |
|---|---|---|
| 713,211 | Great Britain | Aug. 4, 1954 |
| 726,250 | Great Britain | Mar. 16, 1955 |